Patented July 20, 1926.

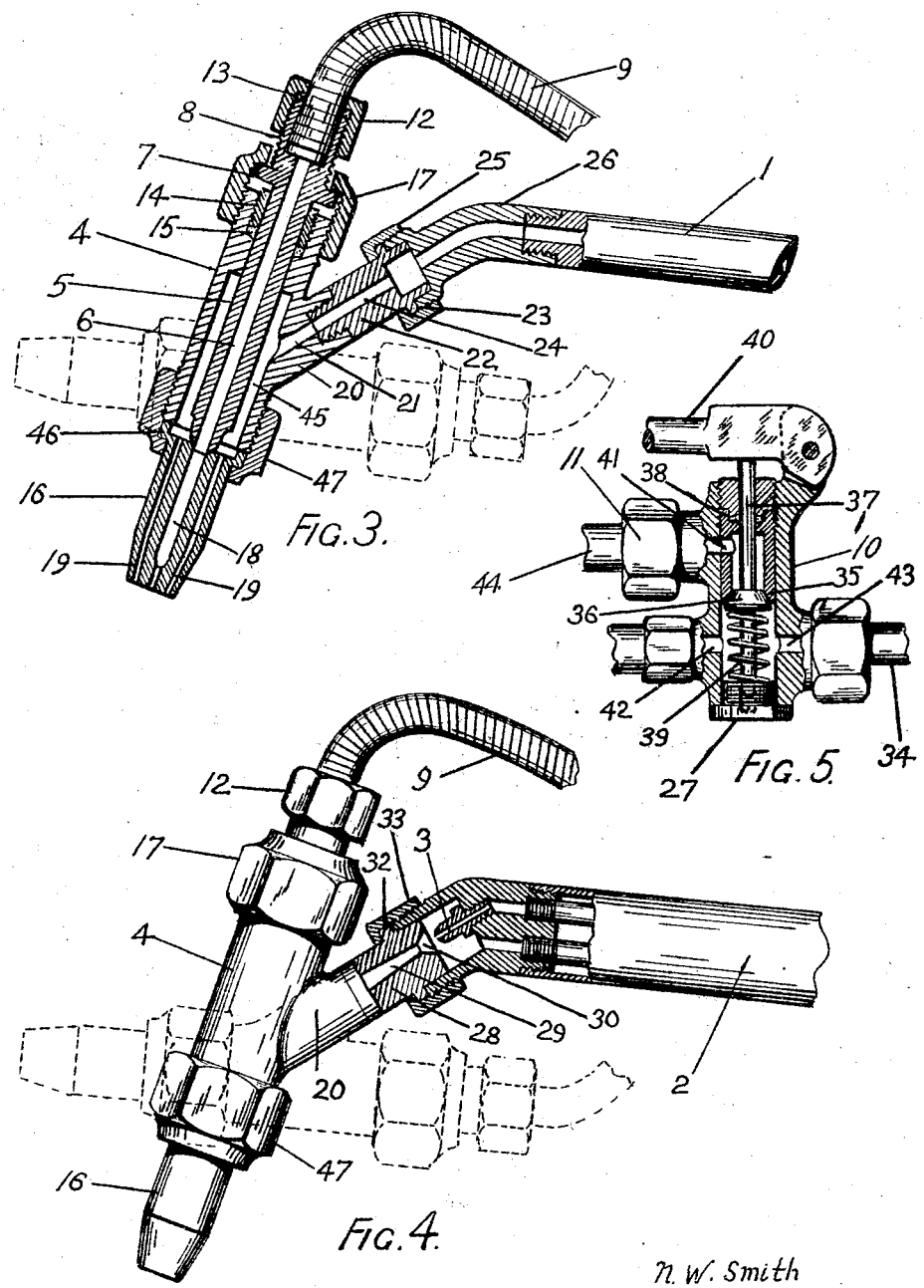

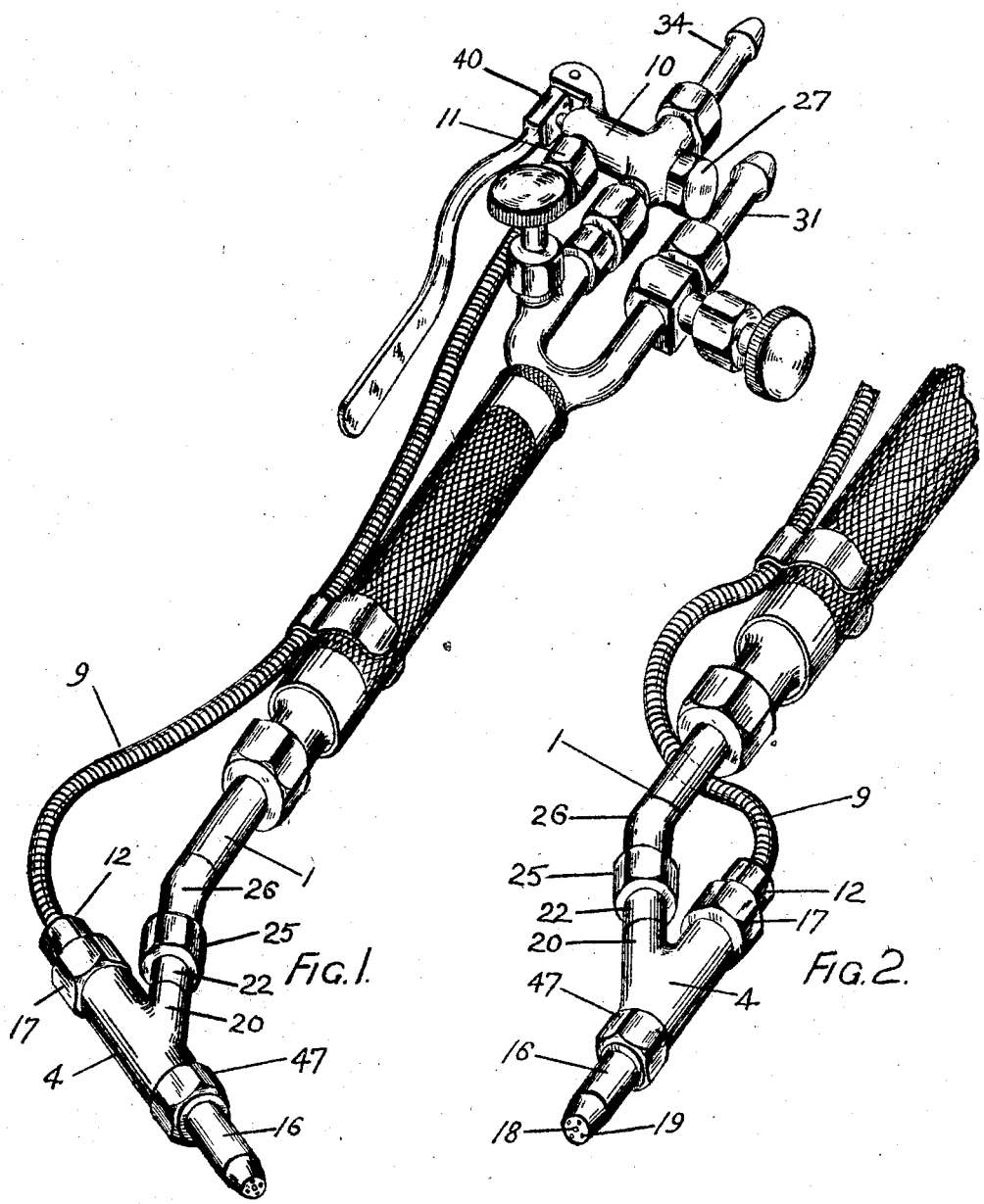

1,593,510

UNITED STATES PATENT OFFICE.

NOAH WHALTON SMITH, OF ASHFIELD, NEAR SYDNEY, NEW SOUTH WALES, AUSTRALIA.

METAL-CUTTING BLOWPIPE.

Application filed December 31, 1925, Serial No. 78,695, and in Australia July 16, 1924.

This invention relates to metal cutting blowpipes and has for its object to provide means in association with welding blowpipes whereby the latter are converted to cutting blowpipes and whereby also the latter blowpipes will be made adaptable for cutting metal with the cutting blowpipe nozzle set at any desired angle for cutting operations.

Embodiments of the invention are illustrated in the accompanying drawings in which Fig. 1 is a perspective view of a welding blowpipe with attachments thereto for converting it to a metal cutting blowpipe; Fig. 2 a broken perspective view of the apparatus shown in Fig. 1 but with the cutting head and nozzle turned at a different angle to the angular direction of the head and nozzle shown in Fig. 1; Fig. 3 broken detail view of a cutting head and nozzle; Fig. 4 broken detail view of the head and nozzle shown in Fig. 3 but with modified form of branch connection for such head to suit an alternative construction of blowpipe; and Fig. 5 a sectional view of a control valve.

The blow pipes utilized may be of usual construction adapted for welding purposes; they may be provided with a shank 1 as shown in Fig. 3 to serve as a conductor for combustible gases, or a shank 2 may be provided as shown in Fig. 4 fitted with an injector 3.

Instead of providing the blowpipe with a fixed head for metal cutting purposes as is the usual practice an adjustable head is fitted thereto whereby the head and its associated cutting nozzle may be turned to enable metal cutting operations to be performed at desired angles of the cutting nozzle. The head is furnished with a body 4 within which is carried the plug 5 having an opening 6. Said plug may be provided with a collar 7 and recessed neck 8, the latter being adapted to receive one end of the flexible tube 9 whose other end is connected to a nipple 44 on the oxygen control valve 10 by means of the nut 11.

A nut 12 screwed to the neck 8 serves to retain a packing washer 13 in the said neck to make a gas tight joint between the end of the flexible tube 9 in the neck 8 and the said neck. A gland nut 14 also serves to hold the gas tight packing washer 15 in position around the plug 5 and within a recess in such plug. The forward end of the plug 5 is held against the cutting nozzle 16 by means of the nut 17 which bears against the collar 7 on the said plug and fits the externally screw threaded end of the body 4. Said cutting nozzle 16 has an opening 18 for passage thereto of a supply of oxygen for cutting purposes and also an opening 19 for passage therethrough of combustible gases for heating purposes. There is a passage 45 in the body 4 through which combustible gases from the neck 20 are passed to the opening 19 in the nozzle 16. On the latter is a flange 46 against which the union nut 47 securable to the body 4 is adapted to take to ensure that the forward end of the plug 5 will be held in contact with the said nozzle 16.

On one side of the body 4 is the tapped neck 20 adapted to have secured thereto a branch connection and having a gas passage 21. The branch connection shown in Fig. 3 consists of a plug 22 fitting the neck 20 at one end and having a collar 23 near its other end, such plug 22 also having a gas passage 24. Associated with one end of the plug 22 by means of the union nut 25 is the tube 26 adapted also to be screwed to the shank 1 of the blowpipe. In Fig. 4 the branch connection consists of a plug 28 fitting the neck 20 and having a gas mixing passage 29 and a gas injector cone 30 facing the injector 3 in the shank 2 of the blowpipe. On the plug 28 is a collar 32 and said plug is secured to the neck 20 by means of a union nut 33.

The head and its associated cutting nozzle as previously described is turnable in relation to the shank of the blowpipe through the branch connections described and the flexible tubing 9, whilst such branch connections also permit the attachment of such heads as desired to blowpipes of particular types.

To permit oxygen to be supplied to the flexible tubing 9 as well as to the shank of the blowpipe the control valve 10 is provided. Such control valve has a nipple 34 to which a flexible tube may be attached leading to a source of oxygen. Within the valve 10 is a seating 35 for the conical valve 36 whose spindle 37 projects at one end through the stuffing box 38 at one end of the said valve 10. A compressible coil spring 39 within the valve 10 normally keeps the conical valve 36 on its seating 35 whilst the projecting end of the spindle 37 is adapted to contact with the handle 40 and to be moved by said handle when the latter is pressed towards the said valve 10; said handle is pivotally connected to the valve 10. The spring 36 has its opposite ends abutting respectively the recessed plug 27 (fitting the valve 10) and the conical valve 36. In the valve 10 are ports 41, 42, and 43: the port 41 leads to the nipple 44 to which one end of the flexible tube 9 is connected, and the port 42 to the shank of the blowpipe, whilst the port 43 leads from the oxygen supply nipple 34. A supply of hydrogen may be made to the shank of the blowpipe through the nipple 31.

When it is desired to utilize the blowpipe for cutting metal at any particular angle it is only necessary to adjust the head with the associated cutting nipple by turning same to the desired angle in relation to the blowpipe shank and to operate the valve 36 through the press handle 40 whereby a supply of oxygen for cutting purposes will be supplied to the plug 5 and from thence to the cutting nozzle 16.

What I claim as my invention and desire to secure by Letters Patent is:—

1. A metal cutting blowpipe including a hollow shank forming a handle, the forward end of the shank being arranged at an obtuse angle to the main portion, a head provided with longitudinal passages and including a lateral neck projecting rearwardly at an obtuse angle and rotatably mounted on the angularly extending forward end of the shank, a cutting nozzle on the forward end of the head, a hollow flexible tubing connected to the inner end of the head, and valve means for controlling the passage of oxygen and combustible gas through the shank and tubing to the nozzle.

2. A metal cutting blowpipe as claimed in claim 1, wherein the head also includes a tubular body portion the bore of which is restricted adjacent one end, a tubular plug mounted longitudinally through the restricted bore having the forward end contacting with the nozzle so as to leave a chamber between the outer surface of the plug and the inner surface of the body, the obtusely extending neck communicating with said chamber, and the nozzle being provided with passageways communicating respectively with the bore of the plug and the chamber, substantially as and for the purposes set forth.

In testimony whereof I affix my signature.

NOAH WHALTON SMITH.